US012125421B2

(12) United States Patent
Ha et al.

(10) Patent No.: US 12,125,421 B2
(45) Date of Patent: Oct. 22, 2024

(54) DISPLAY SYSTEM AND METHOD OF DRIVING THE SAME

(71) Applicant: SAMSUNG DISPLAY CO., LTD., Yongin-si (KR)

(72) Inventors: Tae-Seok Ha, Hwaseong-si (KR); Woon-Rok Jang, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/156,568

(22) Filed: Jan. 19, 2023

(65) Prior Publication Data

US 2023/0386375 A1 Nov. 30, 2023

(30) Foreign Application Priority Data

May 30, 2022 (KR) ........................ 10-2022-0066257

(51) Int. Cl.
*G09G 3/00* (2006.01)

(52) U.S. Cl.
CPC ..... *G09G 3/006* (2013.01); *G09G 2300/0842* (2013.01); *G09G 2310/08* (2013.01); *G09G 2320/045* (2013.01); *G09G 2330/021* (2013.01); *G09G 2330/12* (2013.01)

(58) Field of Classification Search
CPC ........... G09G 3/006; G09G 2300/0842; G09G 2310/08; G09G 2320/045; G09G 2330/021; G09G 2330/12; G09G 2300/0819; G09G 2320/029; G09G 2320/046; G09G 2330/026; G09G 3/3233; G09G 3/3208; G09G 3/32; G09G 3/3225; G09G 3/36; G09G 3/3648; G09G 2320/02; G09G 2320/0252; G09G 2320/043; G09G 2330/02
See application file for complete search history.

(56) References Cited

U.S. PATENT DOCUMENTS 10,262,582 B2 * 4/2019 Han ..................... G09G 3/3208
2010/0295840 A1 * 11/2010 Uno ..................... G09G 3/3406
345/212

(Continued)

FOREIGN PATENT DOCUMENTS

CN 112667294 4/2021
KR 10-2017-0015582 2/2017

(Continued)

*Primary Examiner* — Jose R Soto Lopez
(74) *Attorney, Agent, or Firm* — F. Chau & Associates, LLC

(57) ABSTRACT

A display system includes a display device including a plurality of pixels and a sensing circuit that senses degradation information of the pixels, and a power supply that supplies a power to the display device or stops a supply of the power to the display device. The sensing circuit senses first degradation information of pixels in a first area in which a logo is displayed after the power supply supplies the power to the display device and before the display device displays a logo image including the logo, and senses second degradation information of pixels in a second area other than the first area in a display area after the display device displays the logo image and before the display device displays a normal image not including the logo.

15 Claims, 8 Drawing Sheets

(56) References Cited

U.S. PATENT DOCUMENTS

| | | | | |
|---|---|---|---|---|
| 2011/0037993 | A1* | 2/2011 | Lee | G06F 9/4418 358/1.14 |
| 2012/0169931 | A1* | 7/2012 | Mohapatra | H04N 21/42692 348/563 |
| 2013/0320848 | A1* | 12/2013 | Miyake | H05B 47/00 315/53 |
| 2015/0006872 | A1* | 1/2015 | Sonobe | G06F 3/14 713/2 |
| 2015/0145972 | A1* | 5/2015 | Irie | G09G 3/3607 348/55 |
| 2016/0148557 | A1* | 5/2016 | Hori | G09G 3/2096 345/212 |
| 2016/0217770 | A1* | 7/2016 | Kang | G06F 3/0304 |
| 2016/0292422 | A1* | 10/2016 | Hayashi | G06F 21/52 |
| 2017/0032723 | A1* | 2/2017 | Kim | G09G 3/3266 |
| 2017/0206856 | A1* | 7/2017 | Song | G09G 5/363 |
| 2017/0256214 | A1* | 9/2017 | Satou | G09G 3/3648 |
| 2018/0061913 | A1* | 3/2018 | Kim | G09G 3/3233 |
| 2018/0144689 | A1* | 5/2018 | Hong | G09G 3/3275 |
| 2018/0151112 | A1* | 5/2018 | Song | G09G 3/3258 |
| 2018/0268752 | A1* | 9/2018 | Zhuang | G09G 3/2074 |
| 2018/0350296 | A1* | 12/2018 | Thompson | G06F 3/0673 |
| 2019/0056810 | A1* | 2/2019 | Mai | G06V 10/993 |
| 2019/0103060 | A1* | 4/2019 | Kang | G09G 3/3266 |
| 2019/0189038 | A1* | 6/2019 | Park | G09G 3/3225 |
| 2019/0394418 | A1* | 12/2019 | Yilmaz | G06F 3/147 |
| 2020/0160781 | A1* | 5/2020 | Park | G09G 3/3275 |
| 2020/0302868 | A1* | 9/2020 | Kim | G09G 3/3233 |
| 2020/0349894 | A1* | 11/2020 | Ko | G09G 3/006 |
| 2021/0183283 | A1* | 6/2021 | Park | G09G 3/006 |
| 2021/0201797 | A1* | 7/2021 | Lee | G09G 3/3258 |
| 2021/0201816 | A1* | 7/2021 | Kim | G09G 3/3266 |
| 2021/0210019 | A1* | 7/2021 | Han | G09G 3/3291 |
| 2022/0044623 | A1* | 2/2022 | Park | H05K 1/189 |
| 2022/0103836 | A1* | 3/2022 | Lu | G09G 5/14 |
| 2022/0122548 | A1* | 4/2022 | Choi | G09G 3/3233 |
| 2022/0157234 | A1* | 5/2022 | Kim | G09G 3/3208 |
| 2022/0208082 | A1* | 6/2022 | Ban | G09G 3/32 |
| 2022/0237001 | A1* | 7/2022 | Ma | G09G 3/2096 |
| 2022/0246102 | A1* | 8/2022 | Wang | G09G 3/36 |
| 2022/0415264 | A1* | 12/2022 | Lee | G09G 3/006 |
| 2023/0215316 | A1* | 7/2023 | Baek | G09G 3/3266 345/214 |
| 2023/0410755 | A1* | 12/2023 | An | G09G 3/3233 |

FOREIGN PATENT DOCUMENTS

| | | |
|---|---|---|
| KR | 10-1945890 | 1/2019 |
| KR | 10-2019-0034854 | 4/2019 |

* cited by examiner

DISPLAY SYSTEM AND METHOD OF DRIVING THE SAME

CROSS-REFERENCE TO RELATED APPLICATION(S)

This application claims priority under 35 U.S.C. § 119 to Korean Patent Application No. 10-2022-0066257, filed on May 30, 2022 in the Korean Intellectual Property Office (KIPO), the disclosure of which is incorporated by reference herein in its entirety.

TECHNICAL FIELD

Embodiments of the present disclosure relate to a display system. More particularly, embodiments of the present disclosure relate to a display system including a display device, and a method of driving the display system.

DISCUSSION OF RELATED ART

A display device may include pixels that display an image. Each of the pixels may include a light emitting element that emits light and a driving transistor that provides a driving current to the light emitting element. As the display device is driven for a long time, the light emitting element and/or the driving transistor may be degraded, and as a result, each of the pixels including the light emitting element and the driving transistor may be degraded.

SUMMARY

Embodiments provide a display system that may prevent or reduce a delay when displaying an image due to on-sensing, and a method of driving the display system.

A display system according to embodiments includes a display device including a plurality of pixels and a sensing circuit that senses degradation information of the pixels, and a power supply that supplies a power to the display device or stops a supply of the power to the display device. The sensing circuit senses first degradation information of pixels from among the plurality of pixels in a first area in which a logo is displayed after the power supply supplies the power to the display device and before the display device displays a logo image including the logo. The sensing circuit senses second degradation information of pixels from among the plurality of pixels in a second area other than the first area in a display area after the display device displays the logo image and before the display device displays a normal image not including the logo.

In an embodiment, the display device further includes a memory that stores degradation data corresponding to the degradation information of the pixels.

In an embodiment, the power supply supplies the power to the display device again after stopping supply of the power to the display device after the display device displays the logo image and before the sensing circuit senses the second degradation information.

In an embodiment, the sensing circuit writes first degradation data corresponding to the first degradation information to the memory after the sensing circuit senses the first degradation information and before the display device displays the logo image. The sensing circuit writes second degradation data corresponding to the second degradation information to the memory after the sensing circuit senses the second degradation information and before the display device displays the normal image.

In an embodiment, the display device displays a black image in which the display area is black after the display device displays the logo image and before the sensing circuit senses the second degradation information.

In an embodiment, the sensing circuit writes first degradation data corresponding to the first degradation information and second degradation data corresponding to the second degradation information to the memory after the sensing circuit senses the second degradation information and before the display device displays the normal image.

In an embodiment, the display system further includes a processor that provides a first control signal for sensing the first degradation information and a second control signal for sensing the second degradation information to the display device.

In an embodiment, the processor provides the first control signal to the display device after the power supply supplies the power to the display device and before the sensing circuit senses the first degradation information.

In an embodiment, the processor provides the second control signal to the display device after the display device displays the logo image and before the sensing circuit senses the second degradation information.

In an embodiment, the first area includes first pixel rows including pixels from among the plurality of pixels in which the logo is displayed. The second area includes second pixel rows other than the first pixel rows among all pixels rows from among the plurality of pixels.

A method of driving a display system according to embodiments includes supplying a power to a display device including a plurality of pixels, sensing first degradation information of pixels from among the plurality of pixels in a first area in which a logo is displayed, displaying a logo image including the logo, sensing second degradation information of pixels from among the plurality of pixels in a second area other than the first area in a display area, and displaying a normal image not including the logo.

In an embodiment, the method further includes supplying the power to the display device again after stopping supply of the power to the display device after displaying the logo image and before sensing the second degradation information.

In an embodiment, the method further includes writing first degradation data corresponding to the first degradation information to a memory after sensing the first degradation information and before displaying the logo image, and writing second degradation data corresponding to the second degradation information to the memory after sensing the second degradation information and before displaying the normal image.

In an embodiment, the method further includes displaying a black image in which the display area is black after displaying the logo image and before sensing the second degradation information.

In an embodiment, the method further includes writing first degradation data corresponding to the first degradation information and second degradation data corresponding to the second degradation information to a memory after sensing the second degradation information and before displaying the normal image.

In an embodiment, the method further includes providing a first control signal for sensing the first degradation information to the display device after supplying the power to the display device and before sensing the first degradation information.

In an embodiment, the method further includes providing a second control signal for sensing the second degradation information to the display device after displaying the logo image and before sensing the second degradation information.

A method of driving a display system according to embodiments includes supplying a power to a display device including a plurality of pixels, determining whether a first control signal for sensing first degradation information of pixels from among a plurality of pixels in a first area in which a logo is displayed is provided, sensing the first degradation information of the pixels in the first area when the first control signal is provided, displaying a logo image including the logo, determining whether a second control signal for sensing second degradation information of pixels from among the plurality of pixels in a second area other than the first area in a display area is provided, sensing the second degradation information of the pixels in the second area when the second control signal is provided, and displaying a normal image not including the logo.

In an embodiment, the method further includes sensing degradation information of pixels in the display area when the first control signal is not provided.

In an embodiment, the method further includes, when the second control signal is not provided, displaying a block image in which the display area is black and determining whether the second control signal is provided again.

In a display system and a method of driving the display system according to embodiments, degradation information of pixels in a first area in which a logo is displayed is sensed before a display device displays a logo image, and degradation information of pixels in a second area other than the first area in a display area is sensed after the display device displays the logo image and before the display device displays a normal image. As a result, delay in image display due to sensing of the degradation information of pixels may be prevented or reduced.

BRIEF DESCRIPTION OF THE DRAWINGS

The above and other features of the present disclosure will become more apparent by describing in detail embodiments thereof with reference to the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Figure 1:
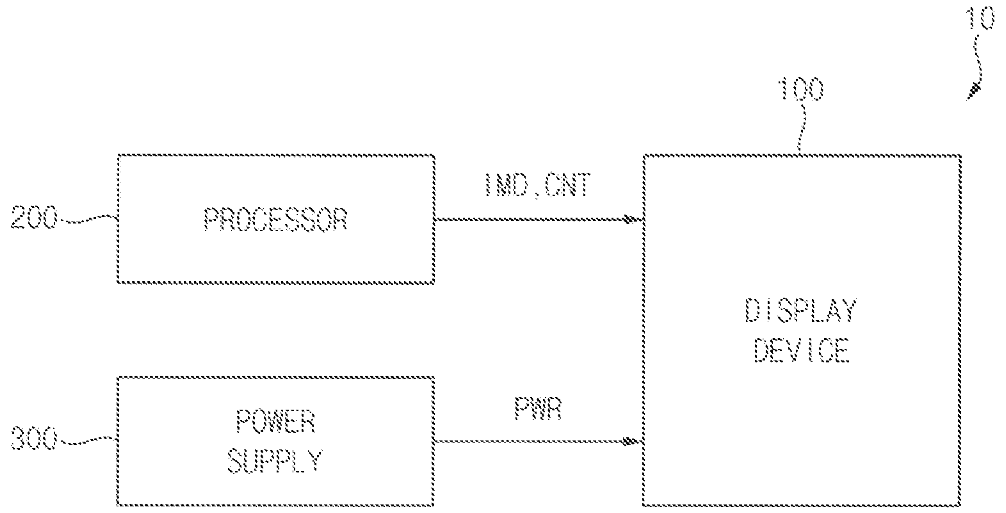

FIG. 1 is a block diagram illustrating a display system according to an embodiment.

Figure 2:
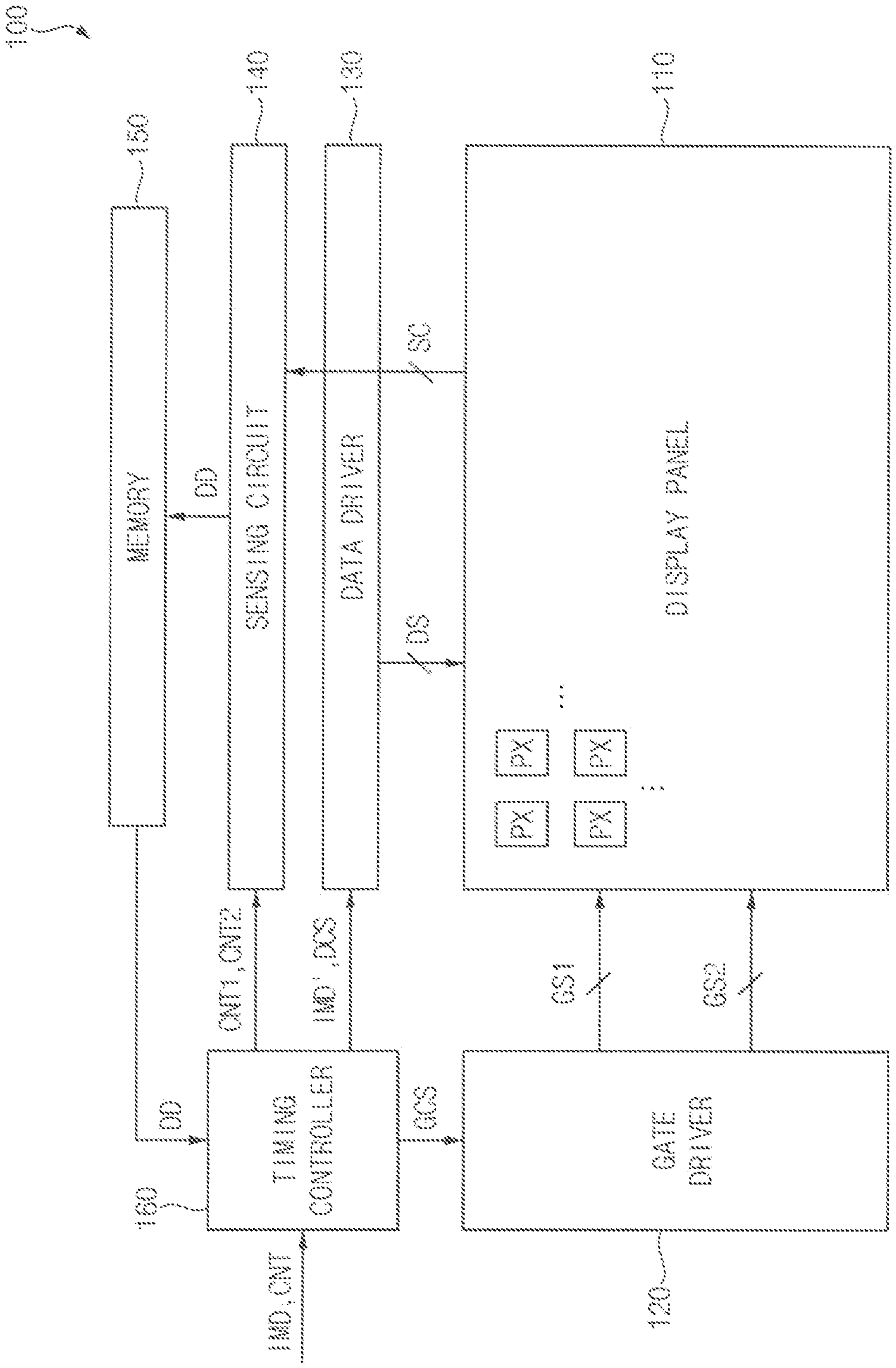

FIG. 2 is a block diagram illustrating a display device included in the display system in FIG. 1 according to an embodiment.

Figure 3:
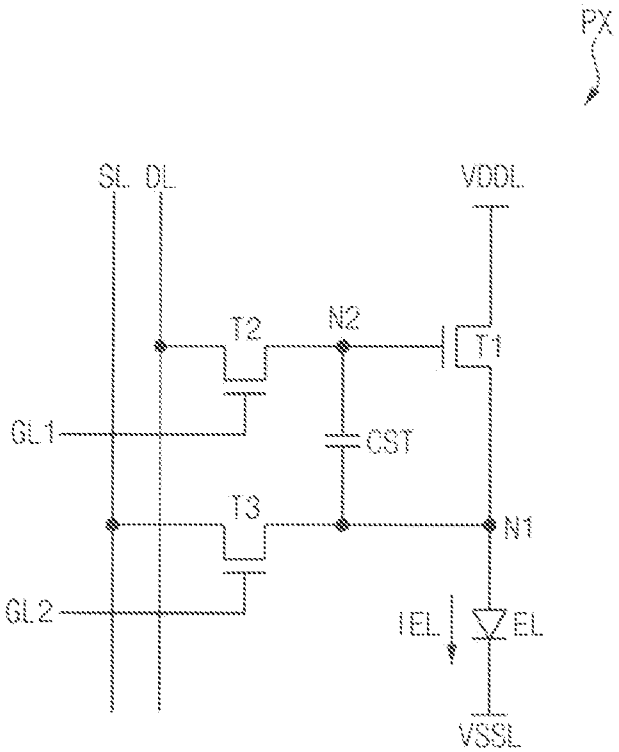

FIG. 3 is a circuit diagram illustrating a pixel included in the display device in FIG. 2 according to an embodiment.

Figure 4:
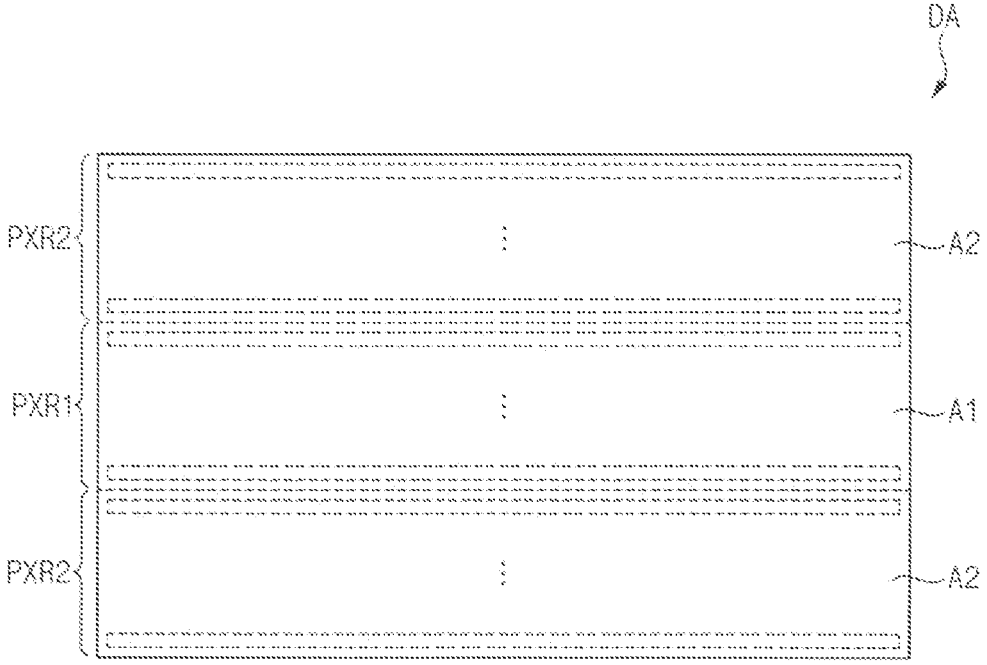

FIG. 4 is a plan view illustrating a display area of the display device in FIG. 1 according to an embodiment.

Figure 5:
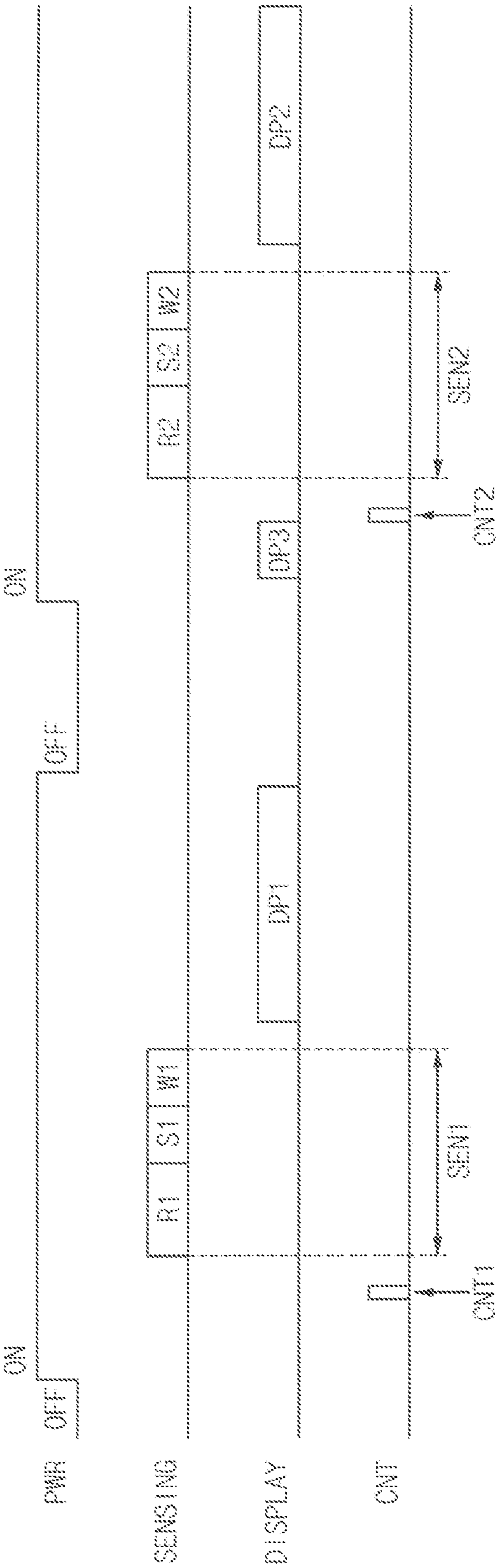
Figure 6:
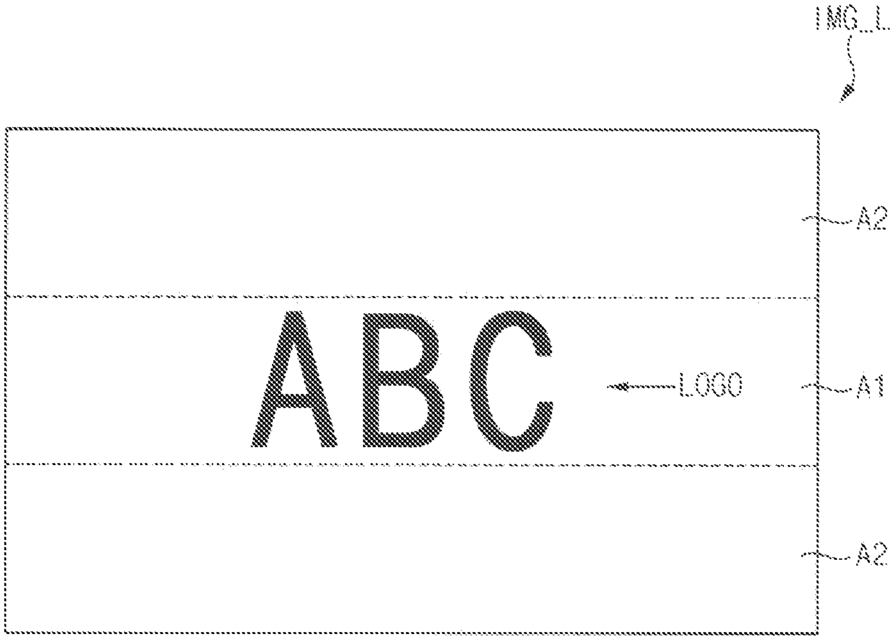
Figure 7:
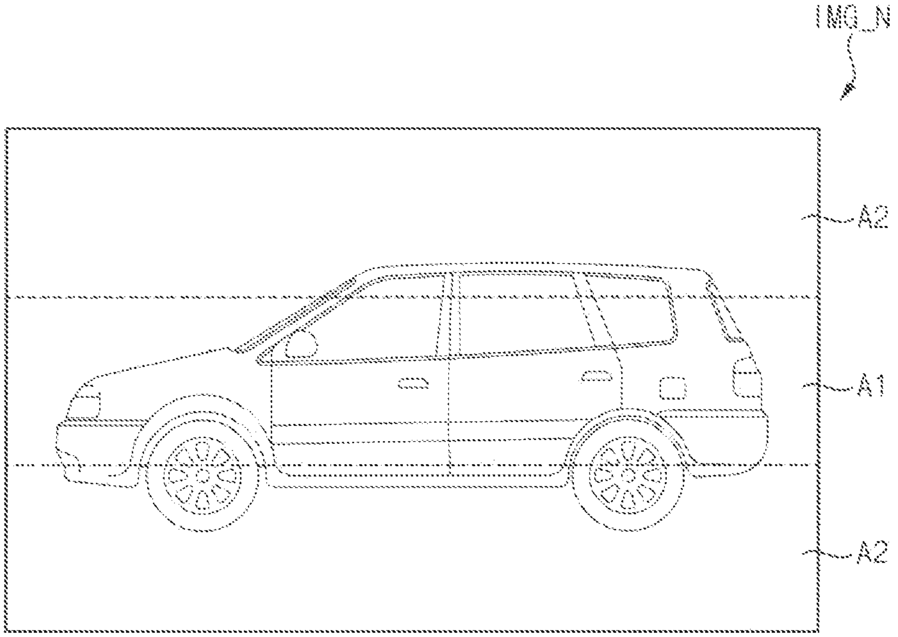

FIGS. 5, 6, and 7 are diagrams referred to when describing an operation of a display system according to an embodiment.

Figure 8:
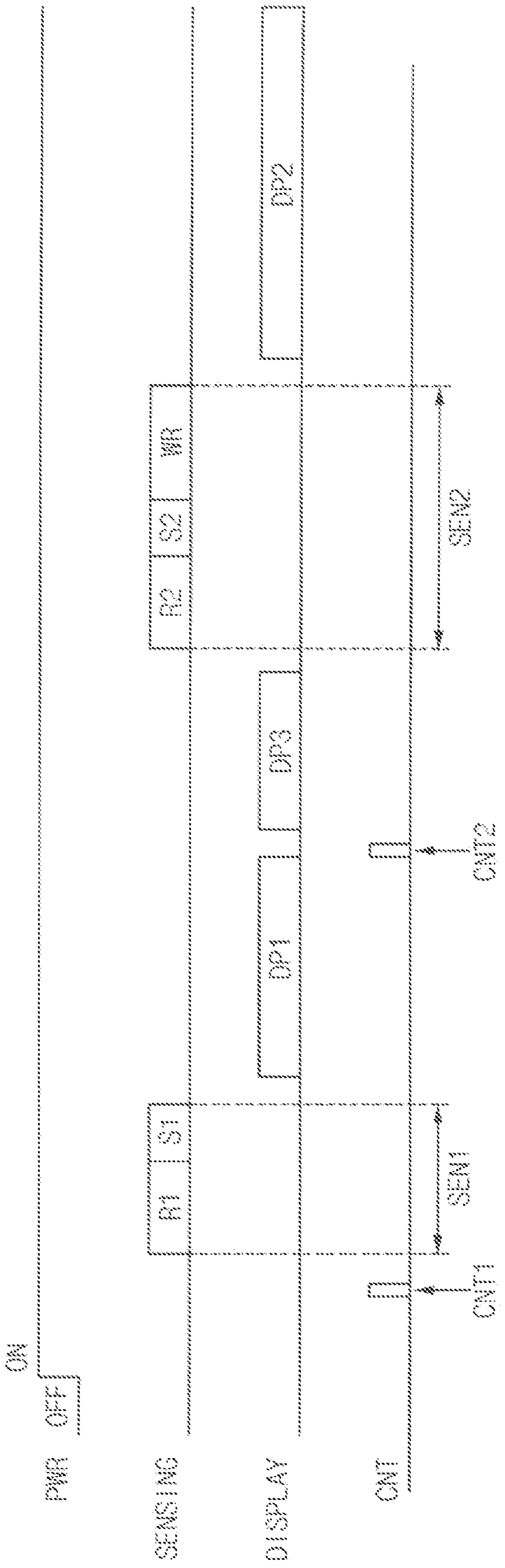

FIG. 8 is a diagram referred to when describing an operation of a display system according to an embodiment.

Figure 9:
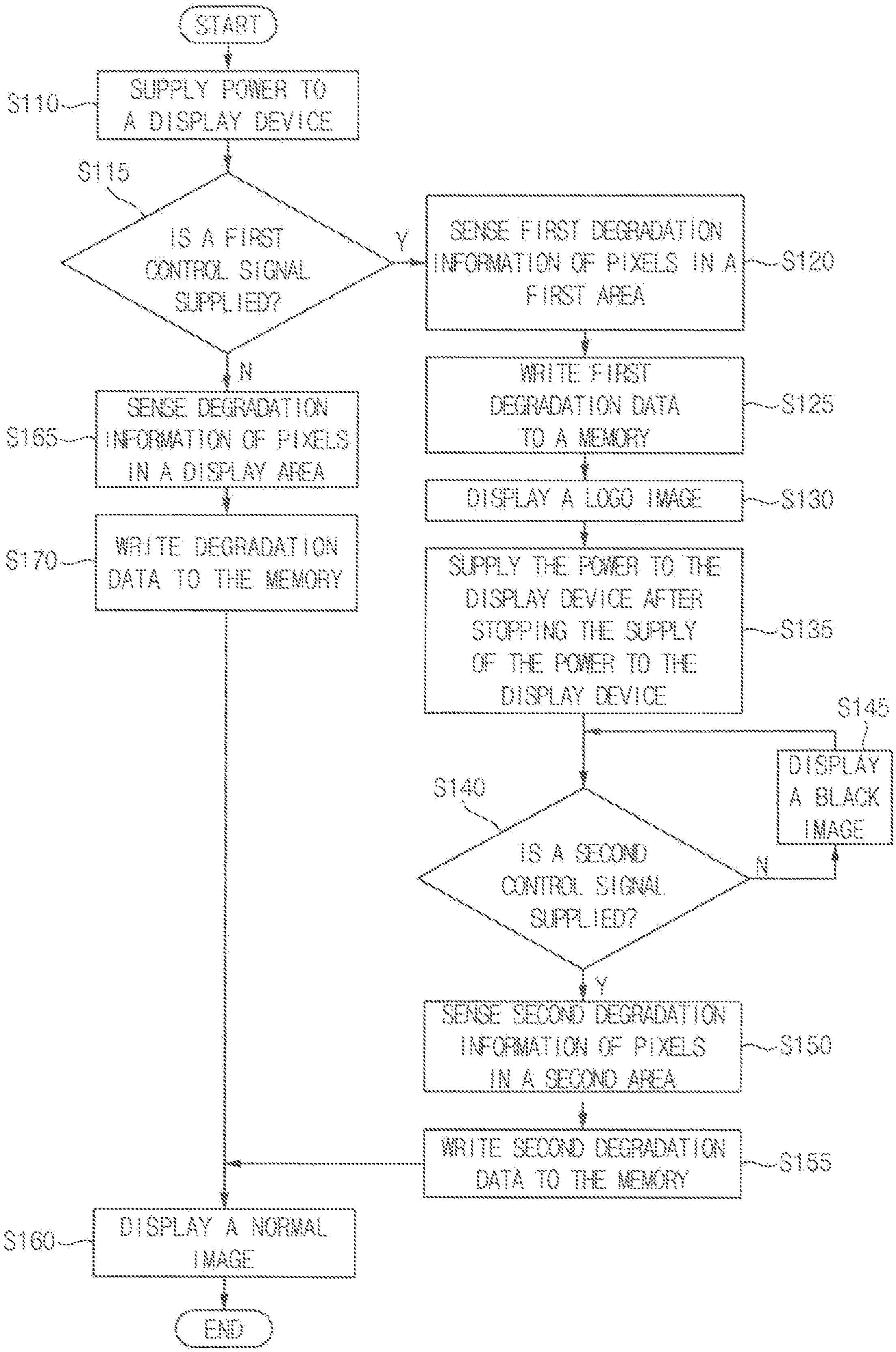

FIG. 9 is a flowchart illustrating a method of driving a display system according to an embodiment.

Figure 10:
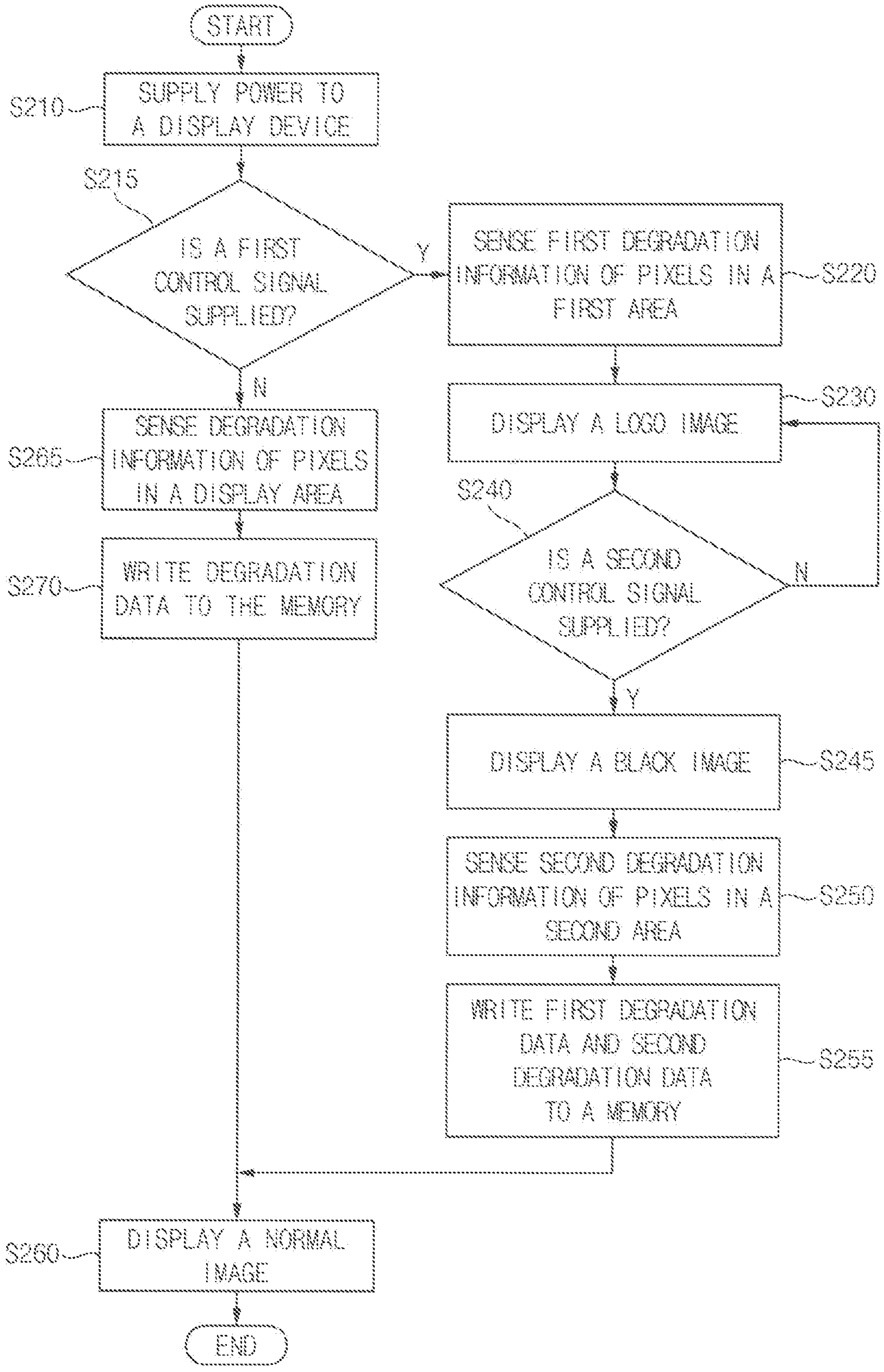

FIG. 10 is a flowchart illustrating a method of driving a display system according to an embodiment.

DETAILED DESCRIPTION OF THE EMBODIMENTS

Embodiments of the present disclosure will be described more fully hereinafter with reference to the accompanying drawings. Like reference numerals may refer to like elements throughout the accompanying drawings.

FIG. 1 is a block diagram illustrating a display system 10 according to an embodiment. FIG. 2 is a block diagram illustrating a display device 100 included in the display system 10 in FIG. 1 according to an embodiment. FIG. 3 is a circuit diagram illustrating a pixel PX included in the display device 100 in FIG. 2 according to an embodiment. FIG. 4 is a plan view illustrating a display area DA of the display device 100 in FIG. 1 according to an embodiment.

Referring to FIGS. 1, 2, 3, and 4, the display system 10 may include a display device 100, a processor 200, and a power supply 300.

The processor 200 may provide image data IMD and control signals CNT to the display device 100. The control signals CNT may include, for example, a vertical synchronization signal, a horizontal synchronization signal, a clock signal, a data enable signal, a first control signal CNT1, and a second control signal CNT2.

The power supply 300 may supply power PWR utilized to drive the display device 100, or may stop the supply of the power PWR to the display device 100.

The display device 100 may display an image based on the image data IMD. The display device 100 may be turned on when the power PWR is supplied from the power supply 300, and may be turned off when the supply of the power PWR from the power supply 300 is stopped.

The display device 100 may include a display panel 110, a gate driver 120, a data driver 130, a sensing circuit 140, a memory 150, and a timing controller 160.

The display panel 110 may include various display elements such as, for example, an organic light emitting diode ("OLED") or the like. Hereinafter, the display panel 110 including the organic light emitting diode as a display element will be described for convenience of explanation. However, embodiments of the present disclosure are not limited thereto. For example, according to embodiments, the display panel 110 may include various display elements such as a liquid crystal display ("LCD") element, an electrophoretic display ("EPD") element, an inorganic light emitting diode, a quantum-dot light emitting diode ("QLED"), or the like.

The display panel 110 may include a plurality of pixels PX. Each of the pixels PX may be electrically connected to a data line DL, gate lines GL1 and GL2, and a sensing line SL. Further, each of the pixels PX may be electrically connected to a driving voltage line VDDL and a common voltage line VSSL, and may receive a driving voltage and a common voltage from the driving voltage line VDDL and the common voltage line VSSL, respectively.

Each of the pixels PX may include a first transistor T1, a second transistor T2, a third transistor T3, a storage capacitor CST, and a light emitting element EL.

The first transistor T1 may provide a driving current IEL to the light emitting element EL. A first electrode of the first transistor T1 may be connected to the driving voltage line VDDL, and a second electrode of the first transistor T1 may be connected to a first node N1. A gate electrode of the first transistor T1 may be connected to a second node N2. The first transistor T1 may be referred to as a driving transistor.

The second transistor T2 may be turned on in response to a first gate signal GS1 transmitted from a first gate line GL1 to provide a data signal DS transmitted from the data line DL to the second node N2. A first electrode of the second transistor T2 may be connected to the data line DL, and a second electrode of the second transistor T2 may be connected to the second node N2. A gate electrode of the second transistor T2 may be connected to the first gate line GL1. The second transistor T2 may be referred to as a switching transistor.

The third transistor T3 may be turned on in response to a second gate signal GS2 transmitted from the second gate line GL2 to connect the sensing line SL to the first node N1. A first electrode of the third transistor T3 may be connected to the sensing line SL, and a second electrode of the third transistor T3 may be connected to the first node N1. A gate electrode of the third transistor T3 may be connected to the second gate line GL2. The third transistor T3 may be referred to as a sensing transistor.

The storage capacitor CST may maintain a voltage between the first node N1 and the second node N2. A first electrode of the storage capacitor CST may be connected to the first node N1, and a second electrode of the storage capacitor CST may be connected to the second node N2.

The light emitting element EL may emit light based on the driving current IEL provided from the first transistor T1. A first electrode of the light emitting element EL may be connected to the first node N1, and a second electrode of the light emitting element EL may be connected to the common voltage line VSSL.

The gate driver 120 may provide the first gate signal GS1 and the second gate signal GS2 to the pixels PX. The gate driver 120 may generate the first gate signal GS1 and the second gate signal GS2 based on gate control signals. The gate control signals GCS may include, for example, a gate start signal, a gate clock signal, or the like.

The data driver 130 may provide the data signals DS to the pixels PX. The data driver 130 may generate the data signals DS based on compensated image data IMD' and data control signals DCS. The compensated image data IMD' may include grayscale values respectively corresponding to the pixels PX. The data control signals DCS may include, for example, a data start signal, a data clock signal, or the like.

The sensing circuit 140 may sense degradation information of the pixels PX, and may generate degradation data DD corresponding to the degradation information of the pixels PX. The sensing circuit 140 may receive sensing currents SC including the degradation information of the pixels PX through the sensing lines SL electrically connected to the pixels PX. The degradation information of the pixels PX may include, for example, a threshold voltage and mobility of the first transistor T1 included in each of the pixels PX, a threshold voltage of the light emitting element EL included in each of the pixels PX, or the like. The degradation data DD may include degradation values respectively corresponding to the pixels PX.

The sensing circuit 140 may sense first degradation information of pixels PX in a first area A1 based on the first control signal CNT1, and may sense second degradation information of pixels PX in a second area A2 based on the second control signal CNT2. In an embodiment, the display area DA of the display device 100 includes the first area A1 and the second area A2. The display area DA is an area in which an image is displayed by light emitted from the pixels PX. The first area A1 is an area in which a logo LOGO (see FIG. 6) is displayed, and the second area A2 is an area other than the first area A1 in the display area DA in which the logo LOGO is not displayed.

In an embodiment, the first area A1 includes first pixel rows PXR1 including pixels PX through which the logo LOGO is displayed, and the second area A2 includes second pixel rows PXR2 other than the first pixel rows PXR1 among all pixel rows in which the logo LOGO is not displayed. In other words, when the display device 100 displays a logo image IMG_L (see FIG. 6) including the logo LOGO, the logo LOGO is displayed in the first pixel rows PXR1 and the logo LOGO is not displayed in the second pixel rows PXR2.

In an embodiment, the first area A1 is positioned in a central portion of the display area DA in a column direction (a vertical direction) in which the data line DL extends, and the second area A2 is positioned with the first area A1 positioned between portions of the second area A2 in the column direction (vertical direction). However, embodiments of the present disclosure are not limited thereto. For example, according to embodiments, the first area A1 may be positioned in an upper portion or a lower portion of the display area DA in the column direction. For example, the second area A2 may be positioned below the first area A1 in the column direction when the first area A1 is positioned in the upper portion of the display area DA in the column direction, and the second area A2 may be positioned above the first area A1 in the column direction when the first area A1 is positioned in the lower portion of the display area DA in the column direction.

The memory 150 may store the degradation data DD. The sensing circuit 140 may write the degradation data DD to the memory 150. In an embodiment, the memory 150 may be a non-volatile memory such as, for example, an embedded multimedia card ("eMMC"), a universal flash storage ("UFS"), or the like.

The timing controller 160 may control driving of the gate driver 120, driving of the data driver 130, and driving of the sensing circuit 140. The timing controller 160 may generate the compensated image data IMD', the gate control signals GCS, and the data control signals DCS based on the image data IMD and the control signals CNT. The image data IMD may include grayscale values respectively corresponding to the pixels PX.

The timing controller 160 may compensate the image data IMB using the degradation data DD to generate the compensated image data IMD'. The timing controller 160 may read the degradation data DD from the memory 150. The timing controller 160 may compensate the image data IMB using the degradation data DD, so that the data driver 130 may provide the data signals DS for which the degradation of the pixels PX is compensated to the pixels PX. As a result, image quality of the display device 100 may be increased.

FIGS. 5, 6, and 7 are diagrams referred to when describing an operation of the display system 10 according to an embodiment. FIG. 5 illustrates an operation of the display system 10 over time, FIG. 6 illustrates a logo image IMG_L, and FIG. 7 illustrates a normal image IMG_N.

Referring to FIGS. 5, 6, and 7, in an embodiment, first, the power supply 300 supplies the power PWR to the display device 100. When the power supply 300 supplies the power PWR to the display device 100, a turn-on voltage for turning on the display device 100 is provided to the display device 100, and the gate driver 120, the data driver 130, and the timing controller 160 are driven according to the provision of the turn-on voltage.

Then, the processor 200 may provide the first control signal CNT1 to the display device 100. The first control signal CNT1 may include information indicating that the image data IMD provided from the processor 200 to the display device 100 includes the logo image IMG_L including the logo LOGO.

Then, the sensing circuit 140 may perform a first on-sensing operation during a first on-sensing period SEN1 in response to the first control signal CNT1. The first on-sensing period SEN1 may include a first preparation period R1, a first sensing period S1, and a first writing period W1. The sensing circuit 140 and the timing controller 160 may perform a preparation operation for sensing the first degradation information of the pixels PX in the first area A1 during the first preparation period R1.

The sensing circuit 140 may sense the first degradation information of the pixels PX in the first area A1 during the first sensing period S1. During the first sensing period S1, the gate driver 120 may sequentially provide the first gate signal GS1 and the second gate signal GS2 to the first pixel rows PXR1 disposed in the first area A1, and the data driver 130 may provide the data signals DS for sensing the first degradation information of the pixels PX disposed in the first area A1, and the sensing circuit 140 may sense the first degradation information of the pixels PX in the first area A1 through the sensing currents SC.

The sensing circuit 140 may write the first degradation data corresponding to the first degradation information of the pixels PX in the first area A1 in the memory 150 during the first writing period W1.

Then, the display device 100 may display the logo image IMG_L including the logo LOGO based on the image data IMB provided from the processor 200 during a first display period DP1. The timing controller 160 may compensate the image data IMB using the first degradation data, and the data driver 130 may provide the data signals DS for which the degradation of the pixels in the first area A1 is compensated to the pixels PX. As a result, image quality of the logo image IMG_L displayed by the display device 100 may be increased.

In comparison with an operation of a display system in which the degradation information of the pixels PX in the display area DA is sensed and the degradation data corresponding to the degradation information is written in the memory 150 before the display device 100 displays the logo image IMG_L, in the operation of the display system 10 according to an embodiment of the present disclosure described with reference to FIG. 5, the sensing circuit 140 may sense the first degradation information of the pixels PX in the first area A1 during the first sensing period S1, and may write the first degradation data corresponding to the first degradation information in the memory 150 during the first writing period W1. As a result, the first sensing period S1 and the first writing period W1 may decrease. Accordingly, image delay time from a time point when the power PWR is supplied to the display device 100 to a time point when the display device 100 displays an image may decrease.

Then, the power supply 300 may supply the power PWR to the display device 100 again after stopping the supply of the power PWR to the display device 100. For example, the power supply interruption time from a time point when the power supply 300 stops the supply of the power PWR to the display device 100 to a time point when the power PWR is supplied to the display device 100 again may be about 1 second or more. When the supply of the power PWR from the power supply 300 is stopped, the display device 100 may be turned off, and the turned-off display device 100 does not display an image.

Then, the processor 200 may provide the second control signal CNT2 to the display device 100. The display device 100 may display a black image in which the display area DA is black during a third display period DP3 after the power supply 300 supplies the power PWR to the display device 100 again and before the processor 200 provides the second control signal CNT2 to the display device 100. For example, the display device 100 may display the black image during the third display period DP3 based on image data IMD generated by the display device 100 rather than the image data IMD provided from the processor 200.

Then, the sensing circuit 140 may perform a second on-sensing operation during a second on-sensing period SEN2 in response to the second control signal CNT2. The second on-sensing period SEN2 may include a second preparation period R2, a second sensing period S2, and a second writing period W2. The sensing circuit 140 and the timing controller 160 may perform a preparation operation for sensing the second degradation information of the pixels PX in the second area A2 during the second preparation period R2.

The sensing circuit 140 may sense the second degradation information of the pixels PX in the second area A2 during the second sensing period S2. During the second sensing period S2, the gate driver 120 may sequentially supply the first gate signal GS1 and the second gate signal GS2 to the second pixel rows PXR2 disposed in the second area A2, the data driver 130 may provide the data signals DS for sensing the second degradation information of the pixels PX disposed in the second area A2, and the sensing circuit 140 may sense the second degradation information of the pixels PX in the second area A2 through the sensing currents SC.

The sensing circuit 140 may write the second degradation data corresponding to the second degradation information of the pixels PX in the second area A2 in the memory 150 during the second write period W2.

Then, the display device 100 may display the normal image IMG_N that does not include the logo LOGO based on the image data IMD provided from the processor 200 during a second display period DP2. The timing controller 160 may compensate the image data IMD using the first degradation data and the second degradation data, and the data driver 130 may provide the data signals DS for which degradation of the pixels PX in the display area DA is compensated to the pixels PX. As a result, image quality of the normal image IMG_N displayed by the display device 100 may be increased.

The sensing circuit 140 may sense the first degradation information of the pixels in the first area A1 on which the logo LOGO is displayed after the power supply 300 supplies the power PWR to the display device 100 and before the display device 100 displays the logo image IMG_L. As a result, an image delay time from a time point when the power PWR is supplied to the display device 100 to a time point when the display device 100 displays the logo image IMG_L may decrease. Further, the sensing circuit 140 may sense the second degradation information of the pixels in the second area A2 other than the first area A1 of the display device DA after the display device 100 displays the logo image IMG_L and before the display device 100 displays the normal image IMG_N. As a result, before the display device 100 displays the normal image IMG_N, the degradation information of the pixel PX in the display area DA may be sensed, and the image data IMB may be compensated using the degradation data corresponding to the degradation information of the pixels PX.

FIG. 8 is a diagram referred to when describing an operation of a display system 10 according to an embodiment. FIG. 8 illustrates an operation of the display system 10 over time.

For convenience of explanation, a description of steps of the operation of the display system 10 according to an embodiment described with reference to FIG. 8, which are substantially the same as or similar to those of the operation of the display system 10 according to an embodiment described above with reference to FIG. 5, will be omitted.

Referring to FIG. 8, in an embodiment, first, the power supply 300 supplies the power PWR to the display device 100. Then, the processor 200 may provide the first control signal CNT1 to the display device 100.

Then, the sensing circuit 140 may perform a first on-sensing operation during a first on-sensing period SEN1 in response to the first control signal CNT1. The first on-sensing period SEN1 may include a first preparation period R1 and a first sensing period S1. The sensing circuit 140 and the timing controller 160 may perform a preparation operation for sensing the first degradation information of the pixels PX in the first area A1 during the first preparation period R1. The sensing circuit 140 may sense the first degradation information of the pixels PX in the first area A1 during the first sensing period S1.

Then, the display device 100 may display the logo image IMG_L including the logo LOGO based on the image data IMB provided from the processor 200 during a first display period DP1.

In comparison with the operation of the display system 10 according to an embodiment in which the first on-sensing period SEN1 includes the first writing period W1 described with reference to FIG. 5, in the operation of the display system 10 according to an embodiment described with reference to FIG. 8, the first on-sensing period SEN1 does not include the first writing period W1. As a result, the first on-sensing period SEN1 is decreased. Accordingly, the image delay time from a time point when the power PWR is supplied to the display device 100 to a time point when the display device 100 displays an image may further decrease.

Then, the processor 200 may provide the second control signal CNT2 to the display device 100. The second control signal CNT2 may include information indicating the end of the first display period DP1.

Then, the sensing circuit 140 may perform a second on-sensing operation during a second on-sensing period SEN2 in response to the second control signal CNT2. The second on-sensing period SEN2 may include a second preparation period R2, a second sensing period S2, and a writing period WR. The sensing circuit 140 and the timing controller 160 may perform a preparation operation for sensing the second degradation information of the pixels PX in the second area A2 during the second preparation period R2.

The sensing circuit 140 may sense the second degradation information of the pixels PX in the second area A2 during the second sensing period S2. The sensing circuit 140 may write the first degradation data corresponding to the first degradation information of the pixels PX in the first area A1 and the second degradation data corresponding to the second degradation information of the pixels PX in the second area A2 in the memory 150 during the writing period WR. In comparison with the operation of the display system 10 according to an embodiment in which the first writing period W1 and the second writing period W2 are separated described with reference to FIG. 5, in the operation of the display system 10 described with reference to FIG. 8, the first degradation data and the second degradation data are written at once during the write period WR. As a result, overhead occurred in the process of writing the degradation data in the memory 150 may be reduced.

The display device 100 may display a black image in which the display area DA is black during a third display period DP3 after the processor 200 provides the second control signal CNT2 to the display device 100 and before the sensing circuit 140 senses the second degradation information of the pixels in the second area A2. For example, the display device 100 may display the black image during the third display period DP3 based on image data IMD generated by the display device 100 rather than the image data IMD provided from the processor 200. FIG. 8 illustrates that the third display period DP3 ends before the start of the second preparation period R2. However, embodiments of the present disclosure are not limited thereto. For example, in an embodiment, the third display period DP3 may end before the start of the second sensing period S2.

Then, the display device 100 may display the normal image IMG_N that does not include the logo LOGO based on the image data IMD provided from the processor 200 during a second display period DP2.

FIG. 9 is a flowchart illustrating a method of driving a display system according to an embodiment. The method of driving the display system described with reference to FIG. 9 may correspond to the operation of the display system 10 described with reference to FIG.

Referring to FIG. 9, in a method of driving a display system according to an embodiment, the power supply 300 may supply the power PWR to the display device 100 (S110).

Then, the display device 100 may check to determine whether the first control signal CNT1 is provided (S115). In an embodiment, when the first control signal CNT1 is provided from the processor 200, the image data IMD provided from the processor 200 includes the logo image IMG_L. Accordingly, when the first control signal CNT1 is provided from the processor 200, the sensing circuit 140 may sense the first degradation information of the pixels PX in the first area A1 in which the logo LOGO is displayed (S120). Then, the sensing circuit 140 may write the first degradation data corresponding to the first degradation information of the pixels PX in the first area A1 in the memory 150 (S125).

Then, the display device 100 may display the logo image IMG_L (S130). Then, the power supply 300 may supply the power PWR to the display device 100 again after stopping the supply of the power PWR to the display device 100 (S135).

Then, the display device 100 may check to determine whether the second control signal CNT2 is provided (S140). When the second control signal CNT2 is not provided from the processor 200, the display device 100 may display the black image (S145), and may check to determine whether the second control signal CNT2 is provided again (S140). When the second control signal CNT2 is provided from the processor 200, the sensing circuit 140 may sense the second degradation information of the pixels PX in the second area A2 (S150).

Then, the sensing circuit 140 may write the second degradation data corresponding to the second degradation information of the pixels PX in the second area A2 in the memory 150 (S155). Then, the display device 100 may display the normal image IMG_N (S160).

Referring back to operation S115, in an embodiment, when the first control signal CNT1 is not provided from the processor 200, the image data IMD provided from the processor 200 does not include the logo image IMG_L. Accordingly, when the first control signal CNT1 is not provided from the processor 200, the sensing circuit 140 may sense degradation information of the pixels PX in the display area DA (S165). Then, the sensing circuit 140 may write degradation data corresponding to the degradation information in the memory 150 (S170). Then, the display device 100 may display the normal image IMG_N (S160).

FIG. 10 is a flowchart illustrating a method of driving a display system according to an embodiment.

The method of driving the display system described with reference to FIG. 10 may correspond to the operation of the display system 10 described with reference to FIG. 8.

Referring to FIG. 10, in a method of driving a display system according to an embodiment, the power supply 300 may supply the power PWR to the display device 100 (S210).

Then, the display device 100 may check to determine whether the first control signal CNT1 is provided (S215). In an embodiment, when the first control signal CNT1 is provided from the processor 200, the image data IMD provided from the processor 200 includes the logo image IMG_L. Accordingly, when the first control signal CNT1 is provided from the processor 200, the sensing circuit 140 may sense the first degradation information of the pixels PX in the first area A1 in which the logo LOGO is displayed (S220).

Then, the display device 100 may display the logo image IMG_L (S230).

Then, the display device 100 may check to determine whether the second control signal CNT2 is provided (S240). When the second control signal CNT2 is not provided from the processor 200, the display device 100 may continue to display the logo image IMG_L (S230), and may check to determine whether the second control signal CNT2 is provided again (S240). When the second control signal CNT2 is provided from the processor 200, the display device 100 may display the black image (S245).

Then, the sensing circuit 140 may sense the second degradation information of the pixels PX in the second area A2 (S250).

Then, the sensing circuit 140 may write the first degradation data corresponding to the first degradation information of the pixels PX in the first area A1 and the second degradation data corresponding to the second degradation information of the pixels PX in the second area A2 in the memory 150 (S255). Then, the display device 100 may display the normal image IMG_N (S260).

Referring back to operation S215, in an embodiment, when the first control signal CNT1 is not provided from the processor 200, the image data IMD provided from the processor 200 does not include the logo image IMG_L. Accordingly, when the first control signal CNT1 is not provided from the processor 200, the sensing circuit 140 may sense degradation information of the pixels PX in the display area DA (S265). Then, the sensing circuit 140 may write degradation data corresponding to the degradation information in the memory 150 (S270). Then, the display device 100 may display the normal image IMG_N (S260).

The display system according to embodiments may be applied to, for example, a computer, a notebook, a mobile phone, a smartphone, a smart pad, a PMP, a PDA, an MP3 player, or the like.

Referring to a comparative example, a display device may sense degradation information of pixels to compensate the degradation of the pixels. The display device may compensate image data by using degradation data corresponding to the degradation information of the pixels. Sensing of the degradation information of the pixels may include off-sensing for sensing the degradation information of the pixels after the display device is turned off and on-sensing for sensing the degradation information of the pixels after the display device is turned on. Since the on-sensing is performed after the display device is turned on and before the display device displays an image in the comparative example, delay in image display due to the on-sensing may occur from when the display device is turned on to when the display device displays the image.

As described herein, embodiments of the present disclosure provide a display device that decreases such a delay.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display system, comprising:

a display device including a plurality of pixels and a sensing circuit that senses degradation information of the pixels; and a power supply that supplies a power to the display device or stops a supply of the power to the display device, wherein the sensing circuit senses first degradation information of pixels from among the plurality of pixels in a first area in which a logo is displayed after the power supply supplies the power to the display device and before the display device displays a logo image including the logo, wherein the sensing circuit senses second degradation information of pixels among the plurality of pixels in a second area other than the first area in a display area after the display device displays the logo image and before the display device displays a normal image not including the logo, wherein the display device displays a black image, which is based on image data generated by the display device, in which the display area is black after the display device displays the logo image and before the sensing circuit senses the second degradation information, wherein the power supply supplies the power to the display device again after stopping supply of the power to the display device after the display device displays the logo image and before the sensing circuit senses the second degradation information, wherein supplying the power to the display device includes providing a turn-on voltage to the display device, and a gate driver, a data driver, and a timing controller of the display device are driven according to the turn-on voltage, and wherein sensing the first degradation information, displaying the logo image, supplying the power to the display device again after stopping the supply of the power to the display device, displaying the black image, sensing the second degradation information, and displaying the normal image are sequentially performed.

2. The display system of claim 1, wherein the display device further includes a memory that stores degradation data corresponding to the degradation information of the pixels.

3. The display system of claim 2, wherein the sensing circuit writes first degradation data corresponding to the first degradation information to the memory after the sensing circuit senses the first degradation information and before the display device displays the logo image, and wherein the sensing circuit writes second degradation data corresponding to the second degradation information to the memory after the sensing circuit senses the second degradation information and before the display device displays the normal image.

4. The display system of claim 1, wherein the sensing circuit writes first degradation data corresponding to the first degradation information and second degradation data corresponding to the second degradation information to the memory after the sensing circuit senses the second degradation information and before the display device displays the normal image.

5. The display system of claim 1, further comprising:

a processor that provides a first control signal for sensing the first degradation information and a second control signal for sensing the second degradation information to the display device.

6. The display system of claim 5, wherein the processor provides the first control signal to the display device after the power supply supplies the power to the display device and before the sensing circuit senses the first degradation information.

7. The display system of claim 5, wherein the processor provides the second control signal to the display device after the display device displays the logo image and before the sensing circuit senses the second degradation information.

8. The display system of claim 1, wherein the first area includes first pixel rows including pixels from among the plurality of pixels in which the logo is displayed, and wherein the second area includes second pixel rows other than the first pixel rows among all pixels rows from among the plurality of pixels.

9. A method of driving a display system, the method comprising:

supplying a power to a display device including a plurality of pixels;

sensing first degradation information of pixels from among the plurality of pixels in a first area in which a logo is displayed;

displaying a logo image including the logo;

sensing second degradation information of pixels from among the plurality of pixels in a second area other than the first area in a display area;

displaying a normal image not including the logo;

displaying a black image, which is based on image data generated by the display device, in which the display area is black after displaying the logo image and before sensing the second degradation information; and supplying the power to the display device again after stopping supply of the power to the display device after displaying the logo image and before sensing the second degradation information, wherein supplying the power to the display device includes providing a turn-on voltage to the display device, and a gate driver, a data driver, and a timing controller of the display device are driven according to the turn-on voltage, and wherein sensing the first degradation information, displaying the logo image, supplying the power to the display device again after stopping the supply of the power to the display device, displaying the black image, sensing the second degradation information, and displaying the normal image are sequentially performed.

10. The method of claim 9, further comprising:

writing first degradation data corresponding to the first degradation information to a memory after sensing the first degradation information and before displaying the logo image; and writing second degradation data corresponding to the second degradation information to the memory after sensing the second degradation information and before displaying the normal image.

11. The method of claim 9, further comprising:

writing first degradation data corresponding to the first degradation information and second degradation data corresponding to the second degradation information to a memory after sensing the second degradation information and before displaying the normal image.

12. The method of claim 9, further comprising:

providing a first control signal for sensing the first degradation information to the display device after supplying the power to the display device and before sensing the first degradation information.

13. The method of claim 9, further comprising:

providing a control signal for sensing the second degradation information to the display device after displaying the logo image and before sensing the second degradation information.

14. A method of driving a display system, the method comprising:

supplying a power to a display device including a plurality of pixels;

determining whether a first control signal for sensing first degradation information of pixels from among the plurality of pixels in a first area in which a logo is displayed is provided;

sensing the first degradation information of the pixels in the first area when the first control signal is provided;

displaying a logo image including the logo;

displaying a black image, which is based on image data generated by the display device, in which the display area is black after displaying the logo image;

determining whether a second control signal for sensing second degradation information of pixels from among the plurality of pixels in a second area other than the first area in a display area is provided;

sensing the second degradation information of the pixels in the second area when the second control signal is provided, wherein the black image is displayed before sensing the second degradation information;

displaying a normal image not including the logo; and supplying the power to the display device again after stopping supply of the power to the display device after displaying the logo image and before sensing the second degradation information, wherein supplying the power to the display device includes providing a turn-on voltage to the display device, and a gate driver, a data driver, and a timing controller of the display device are driven according to the turn-on voltage, and wherein sensing the first degradation information, displaying the logo image, supplying the power to the display device again after stopping the supply of the power to the display device, displaying the black image, sensing the second degradation information, and displaying the normal image are sequentially performed.

15. The method of claim 14, further comprising:

sensing degradation information of pixels from among the plurality of pixels in the display area when the first control signal is not provided.

* * * * *